US012780155B2

(12) United States Patent
von der Beeke et al.

(10) Patent No.: US 12,780,155 B2
(45) Date of Patent: Nov. 3, 2026

(54) ELECTRONIC BRAKE SYSTEM, TRAILER VEHICLE AND BRAKE CONTROL DEVICE

(71) Applicant: ZF CV Systems Global GmbH, Bern (CH)

(72) Inventors: Jan-Christoph von der Beeke, Algermissen (DE); Axel Stender, Hameln (DE); Norbert Witte, Lauenau (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 19/172,349

(22) Filed: Apr. 7, 2025

(65) Prior Publication Data

US 2025/0236273 A1 Jul. 24, 2025

Related U.S. Application Data

(63) Continuation of application No. PCT/EP2023/076360, filed on Sep. 25, 2023.

(30) Foreign Application Priority Data

Oct. 18, 2022 (DE) ..................... 10 2022 127 164.1

(51) Int. Cl.
*B60T 8/17* (2006.01)
*B60T 7/20* (2006.01)

(52) U.S. Cl.
CPC .............. *B60T 8/1708* (2013.01); *B60T 7/20* (2013.01)

(58) Field of Classification Search
None
See application file for complete search history.

(56) References Cited

U.S. PATENT DOCUMENTS

| | | | | |
|---|---|---|---|---|
| 6,515,376 | B1 * | 2/2003 | Mederer | B60R 16/03 307/64 |
| 2010/0141029 | A1 * | 6/2010 | Heger | H02J 1/08 307/9.1 |
| 2014/0081544 | A1 | 3/2014 | Fry | |

(Continued)

FOREIGN PATENT DOCUMENTS

| | | |
|---|---|---|
| DE | 37 14 193 A1 | 11/1988 |
| EP | 2 607 195 A2 | 6/2013 |

(Continued)

OTHER PUBLICATIONS

International Search Report of the European Patent Office dated Dec. 14, 2023 for international application PCT/EP2023/076360 on which this application is based.

(Continued)

*Primary Examiner* — Daniel L Greene
(74) *Attorney, Agent, or Firm* — Walter Ottesen, P.A.

(57) ABSTRACT

An electronic brake system for a trailer vehicle includes a brake control device. The electronic brake system further includes a first electrical interface for connecting to a tractor vehicle and having a first voltage supply for specific electrical loads in the trailer vehicle. The electronic brake system further includes a high-speed data interface for connecting to the tractor vehicle, and having a second voltage supply. The brake control device is connected to the second voltage supply.

14 Claims, 6 Drawing Sheets

(56) References Cited

U.S. PATENT DOCUMENTS

| | | | | |
|---|---|---|---|---|
| 2015/0349977 | A1* | 12/2015 | Risse | H04L 12/6418 375/257 |
| 2019/0248346 | A1* | 8/2019 | Wulf | B60T 7/20 |
| 2019/0308594 | A1* | 10/2019 | Fry | B60R 16/023 |

FOREIGN PATENT DOCUMENTS

| | | |
|---|---|---|
| EP | 2 607 196 A2 | 6/2013 |
| EP | 2 821 262 A2 | 1/2015 |
| EP | 3 261 889 B1 | 8/2021 |

OTHER PUBLICATIONS

English translation and Written Opinion of the International Searching Authority dated Dec. 14, 2023 for international application PCT/EP2023/076360 on which this application is based.

* cited by examiner

ELECTRONIC BRAKE SYSTEM, TRAILER VEHICLE AND BRAKE CONTROL DEVICE

CROSS-REFERENCE TO RELATED APPLICATIONS

This application is a continuation application of international patent application PCT/EP2023/076360, filed Sep. 25, 2023, designating the United States and claiming priority from German application 10 2022 127 164.1, filed Oct. 18, 2022, and the entire content of both applications is incorporated herein by reference.

TECHNICAL FIELD

The disclosure relates to an electronic brake system. The disclosure further relates to a trailer vehicle having an electronic brake system, and to a brake control device for an electronic brake system in a trailer vehicle.

BACKGROUND

Conventional trailers for service vehicles, in conjunction with a pneumatic braking device, also include an electronic brake system having a brake control device. The brake control device is continuously supplied with a voltage via a tractor-trailer interface according to ISO 7638-1:2018 or ISO 7638-2:2018. In addition, the trailer vehicle preferably includes a tractor-trailer interface according to ISO 12098:2020, via which a lighting system of the vehicle, in particular a brake light system, is supplied with a voltage. An auxiliary voltage supply of the brake control device via the voltage supply of the brake lights, that is, particularly via the interface according to ISO 12098:2020, is already known. Disadvantageously, the auxiliary voltage supply is only executed during a braking operation, as the brake lights only receive a voltage at this time.

In addition to the brake control device, the trailer vehicle can include further devices for the delivery or processing of volumes of data. In particular, sensors/cameras provided in conjunction with driver assistance systems or for autonomous driving can deliver data, the relaying of which to the tractor vehicle is required. Data can firstly be routed to an electronic control device, and relayed from thence to a tractor-trailer interface. To this end, it is intended that this last-mentioned interface should be a high-speed data interface. In particular, it is intended that data should be transmittable at a rate of up to one Gbit/s or higher. A data connector for a high-speed interface of this type already exists (see, for example, https://www.erich-jaeger.com/de/produkte/liste/product-innovations/event/high-speed-datenuebertragung-fuer-anbaugeraete-und-anhaenger). The data connector contains two high-speed data lines and two power contacts which are appropriate for a voltage supply. Via the interface, a data transmission to the tractor vehicle is enabled, together with a voltage supply to loads in the trailer vehicle.

SUMMARY

It is an object of the disclosure to provide a continuous voltage supply for the brake control device in the electronic brake system of a trailer vehicle, independently of any otherwise customary electrical interfaces.

The above object is, for example achieved via an electronic brake system for a trailer vehicle, the electronic brake system including:

- a brake control device,
- a first electrical interface for connecting to a tractor vehicle, and having a first voltage supply for specific electrical loads in the trailer vehicle, and
- a high-speed data interface for connecting to the tractor vehicle, and having a second voltage supply.

The brake control device is connected to the second voltage supply.

The first electrical interface can be an interface according to ISO 7638-1:2018 or ISO 7638-2:2018. However, other electrical interfaces having a continuous voltage supply are also appropriate for electrical loads of the trailer vehicle. For specific applications and/or in regions outside the EU, other electrical interfaces having a continuous voltage supply may be provided in any event.

The second voltage supply is integrated in the high-speed data interface, and is at least indirectly connected to a voltage source in the tractor vehicle, provided that a connection from the trailer vehicle to the tractor vehicle exists via the high-speed data interface. According to the disclosure, the brake control device in the trailer vehicle is supplied with voltage via the high-speed data interface. Moreover, it is possible for the high-speed data interface, via a data connection, to transmit data at a rate of up to 1 Gbit/s or higher, at least from the trailer vehicle to the tractor vehicle. A connection with two contacts can be provided for the supply of voltage, and likewise for the data connection. In particular, all contacts are arranged within the high-speed data interface. The data connection can additionally include a shielding.

According to a further concept of the disclosure, the brake control device can also be connected to the first voltage supply. In this manner, two voltage supplies are applied to the brake control device. In particular, the first voltage supply can be intended for the unimpaired operation of the brake control device. In the event of the loss of this voltage supply, for example as a result of a cable failure or the release of the plug-in connection, the second voltage supply is available as a back-up solution, such that there is no resulting loss of voltage. Alternatively, the second voltage supply can be the preferred voltage supply for the brake control device, whereas the first voltage supply is employed as a back-up solution.

According to a further concept of the disclosure, the brake control device can be connected to the second voltage supply via an electrical connection and an electronic control device. The electronic control device, in particular, can be a control device to which sensors or other signal generators of the trailer vehicle are connected. Moreover, in this embodiment, the electronic control device is connected to the second voltage supply and, in particular, to the high-speed data interface. The electronic control device thus includes at least one live output, to which the brake control device is connected via the electrical connection. In this manner, the brake control device is indirectly connected to the second voltage supply.

According to a further concept of the disclosure, the electrical connection between the brake control device and the electronic control device can be configured bidirectionally, such that the brake control device, via the electrical connection and the electronic control device, is connected to the second voltage supply, and the electronic control device, via the electrical connection and the brake control device, is connected to the first voltage supply. In this manner, back-up voltage supply solutions are available both for the brake control device and for the electronic control device. In both control devices, the outgoing electrical connection can be open at all times, whereas the incoming connection, in particular, is only open in the event of the failure of the dedicated voltage supply.

According to a further concept of the disclosure, the electronic control device, via the high-speed data interface, can deliver data from at least one sensor of the trailer vehicle to the tractor vehicle. One or more cameras can be provided by way of sensors, data from which are delivered via the high-speed data interface to the tractor vehicle, and are processed therein. This is particularly relevant in conjunction with autonomous driving and/or for driver assistance systems.

According to a further concept of the disclosure, the brake control device can be connected to the first voltage supply via an electrical connection and an electronic control device. In this case, the electronic control device is connected to the first voltage supply, and indirectly supplies a voltage to the brake control device. The brake control device can also be connected to the second voltage supply.

According to the disclosure, the first electrical interface can be configured according to ISO 7638-1:2018 or ISO 7638-2:2018. However, other interfaces having a voltage supply can be provided, in particular interfaces which are present in any event in the utility vehicle sector.

According to the disclosure, the high-speed data interface can also include two data connections and two or more connections to the voltage supply. In this case, at least 4+4 contacts are preferably arranged within the high-speed data interface. Fail-safe capability is further enhanced as a result.

According to the disclosure, the brake control device can be connected to a third voltage supply, wherein the third voltage supply is an element of a further electrical interface for connecting to the tractor vehicle. Fail-safe capability is further enhanced as a result.

According to the disclosure, the further electrical interface can be configured according to ISO 12098:2020. However, other interfaces having a voltage supply can be provided, in particular having a voltage for a brake light and, in particular, interfaces which are present in any event in the utility vehicle sector.

The subject matter of the disclosure also includes a trailer vehicle having an electronic brake system. The trailer vehicle, in particular, can be a trailer vehicle for utility vehicles having an electronic brake system. Within the present meaning, in particular, utility vehicles are vehicles which are intended for employment in freight transport, local transport, long-distance transport, or on construction sites.

According to the disclosure, the trailer vehicle can be a semi-trailer. In this case, the towing utility vehicle will then be a tractor with a semi-trailer unit.

According to the disclosure, the trailer vehicle can be a trailer vehicle of vehicle class O3 or O4. Vehicle classes are summarized in EU Regulation no. 2018/858 of May 30, 2018.

The subject matter of the disclosure also includes a brake control device for an electronic brake system in a trailer vehicle having an electrical connection to an electronic control device for the trailer vehicle and having a voltage supply, according to at least one of the following options:

- when the brake control device is connected to a first voltage supply, the electronic control device can at least be supplied with voltage via the electrical connection and the brake control device;
- when the electronic control device is connected to a second voltage supply, the brake control device can at least be supplied with voltage via the electrical connection and the electronic control device.

For the respective supply of the other control device, the brake control device and the electronic control device are electrically interconnected. In this manner, additional back-up voltage supply solutions can be provided, or the provision of additional and separate voltage supplies can be omitted.

BRIEF DESCRIPTION OF DRAWINGS

The invention will now be described with reference to the drawings wherein.

DETAILED DESCRIPTION

Figure 1:
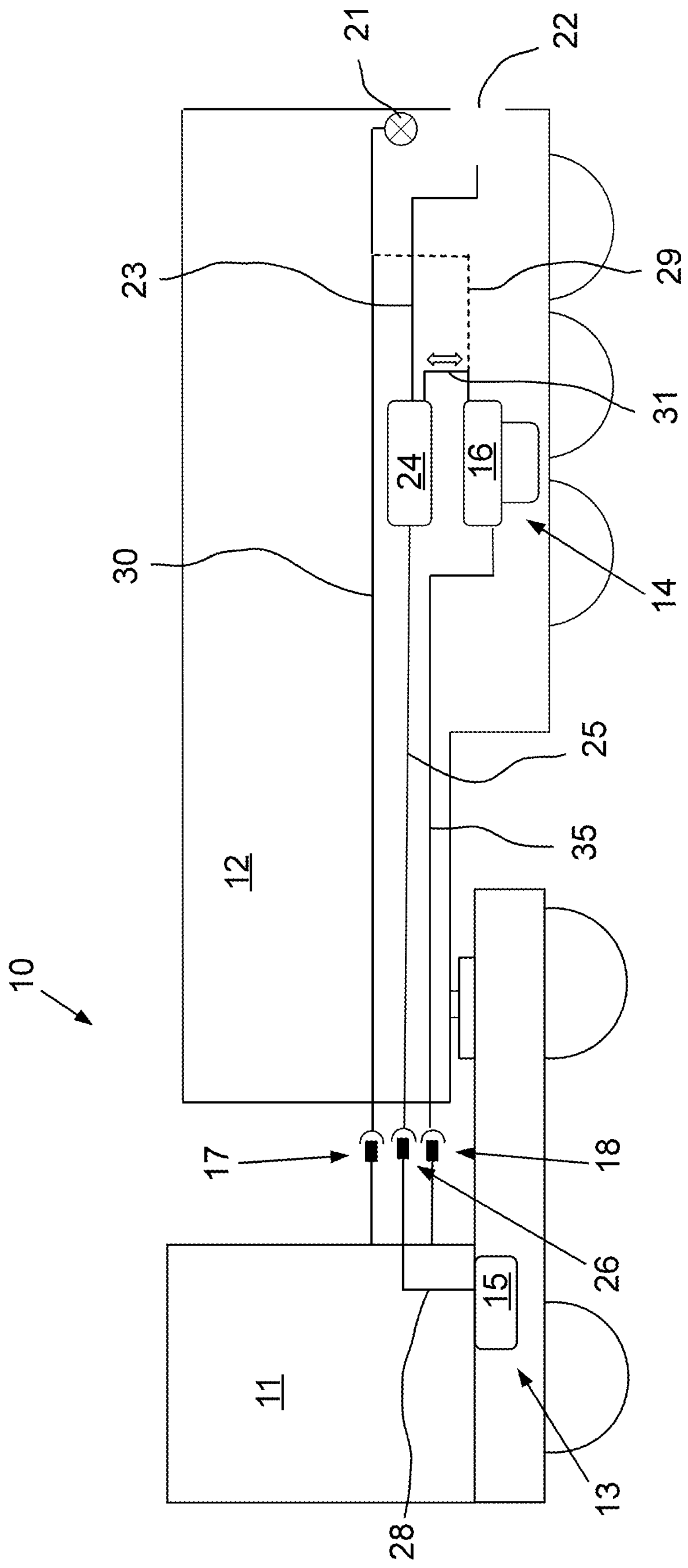
FIG. 1 shows a vehicle combination included of a tractor and a trailer, each having an electronic brake system, according to a first embodiment.

In the present embodiment, the vehicle combination 10 includes a tractor 11 and a semi-trailer 12. The tractor 11 and the semi-trailer 12 respectively include an electronic brake system 13, 14. Each of the two electronic brake systems is associated with a dedicated brake control device 15, 16. The brake control devices 15, 16 actuate further components of the brake systems 13, 14, which are triggered by driver activities, by sensor signals or by other control devices.

By way of electrical connections between the tractor 11 and the semi-trailer 12, and for the interconnection of the brake systems 13, 14, standard electrical interfaces 17, 18 having associated plug connectors 19, 20 are provided. Preferably, the interface 17 and the plug connector 19 are configured according to ISO 12098:2020, whereas the interface 18 and the plug connector 20 correspond to ISO 7638-1:2018 or 7638-2:2018.

On the semi-trailer 12 side, by way of an electrical load which is connected at the interface 17, only a brake light 21 is represented. In practice, further unrepresented electrical loads are connected, for example reversing lights and side lights.

Via the interface 18 having the electrical connection 35, the brake control device 16 in the semi-trailer 12 is supplied with voltage and signals from the tractor vehicle 11. The interface 18 can additionally include further functionalities.

The connection of interfaces 17, 18 on the side of the tractor 11 and of the brake control device 15 is known and, in consequence, is not represented in greater detail here. The tractor 11 can also include further electronic control devices, the arrangement and function of which are known, for example an engine control device.

The semi-trailer 12 includes a sensor 22, which is preferably arranged in a reverse-facing direction and/or is a camera. Signals from the sensor 22 are relayed via an electrical connection 23 to an electronic control unit 24, are processed therein, and are transmitted from thence to the tractor 11. To this end, an electrical connection 25 is routed from the control device 24 to a further interface 26, having a plug connector 27.

The interface 26 between the tractor 11 and the semi-trailer 12 is provided in the form of a high-speed data interface having a voltage supply. To this end, the interface 26 includes at least one data connection for a transmission rate of up to 1 Gbit/s, and a voltage supply. As represented in FIG. 6B, associated lines and contacts can be duplicated, such that at least two data connections and two connections to the voltage supply are provided. The plug connector 27 includes a corresponding number of connecting contacts-four contacts for data connections and four contacts for the voltage supply.

In FIG. 6B, two of the contacts for the voltage supply are identified by the reference numbers 26*a*, 26*b*, and two contacts for data connections are identified by the reference numbers 26*c*, 26*d*. Conversely, only a simple plug connector is disclosed, for example, at www.erich-jaeger.com (see https://www.erich-jaeger.com/de/produkte/liste/product-innovations/event/high-speed-datenuebertragung-fuer-anbaugeraete-und-anhaenger). A simple plug connector can also be provided at this location. A high-speed data interface of a different type-having a voltage supply-can also be provided at this location.

On the side of the tractor 11, an electrical connection 28, which also incorporates a data connection, is routed from the interface 26 to the brake control device 15 and/or to another electronic control device. Signals from the sensor 22 can be received and processed in the brake control device 15 and/or in another control device.

For the brake control device 16, a continuous and reliable voltage supply is particularly important. In the interests of an improved fail-safe capability, by way of a back-up solution, an electrical connection 29 can be provided between the interface 17 and the brake control device 16. Specifically, the electrical connection 29 can be connected in-circuit to a live electrical connection 30 between the plug connector 19 and the brake light 21. The electrical connection 30 is only supplied with voltage, in the event that the illumination of the brake light 21 is also intended. Correspondingly, in the event of the failure of the interface 18, the brake control device 16 will only receive the desired voltage via the electrical connection 29 during a braking process.

In a parallel arrangement with the electrical connection 30, further electrical connections are connected at the interface 17, in particular for the supply of further components of a lighting system of the semi-trailer 12. However, in the interests of clarity, these further electrical connections are not represented here.

Figure 2:
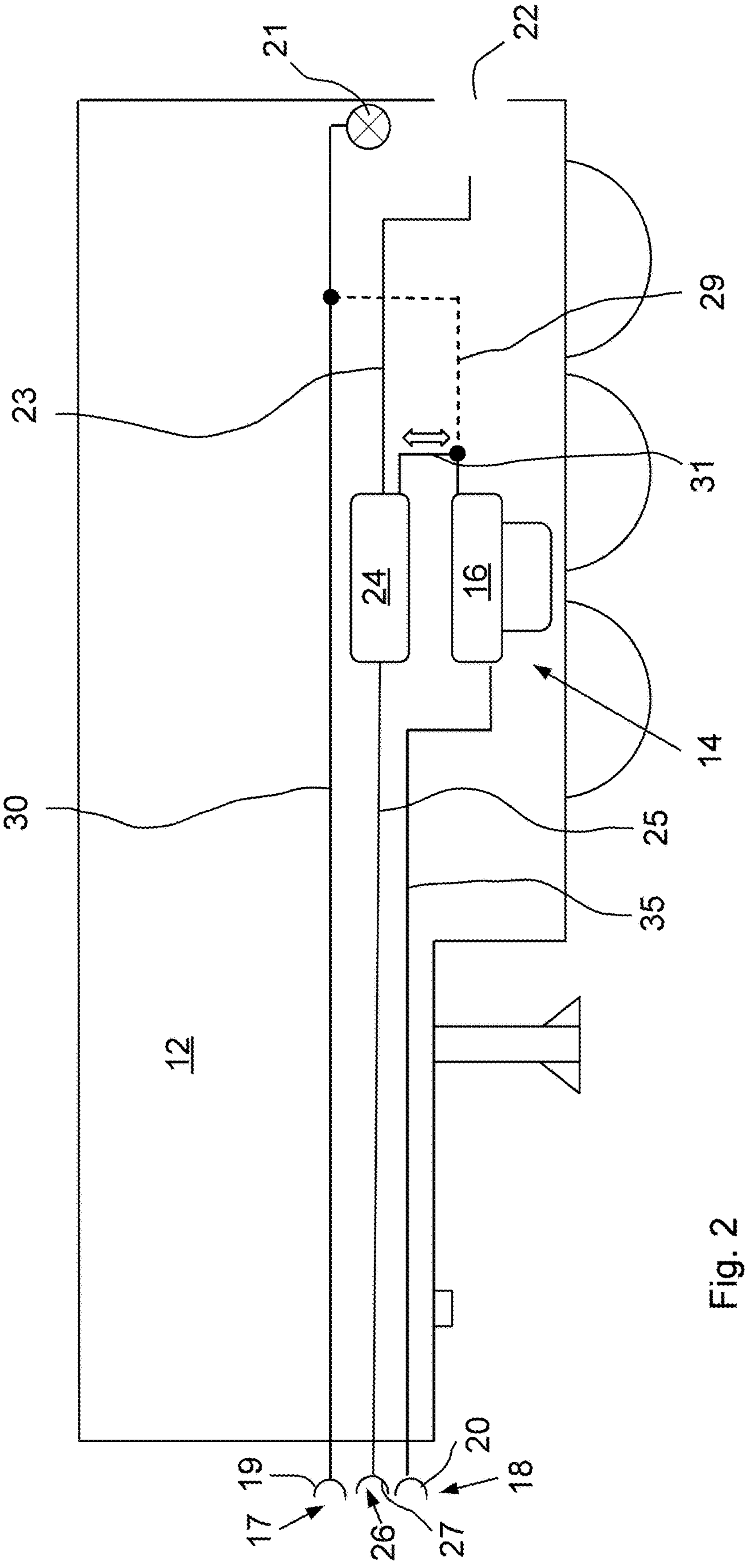
FIG. 2 shows the trailer vehicle according to FIG. 1, in an enlarged representation.

In order to enhance the fail-safe capability of the brake control device 16, in the first embodiment according to FIG. 2, by way of a back-up solution, an electrical connection 31 between the brake control device 16 and the electronic control device 24 is provided. This latter connection is connected to the interface 26 such that, via the interface 26 and the electronic control device 24, a voltage supply of the brake control device 16 can be executed.

The electrical connection 31 is preferably configured bidirectionally such that, at the same time, a back-up solution for the voltage supply to the electronic control device 24 is provided, namely, via the brake control device 16 and the interface 18.

Figure 3:
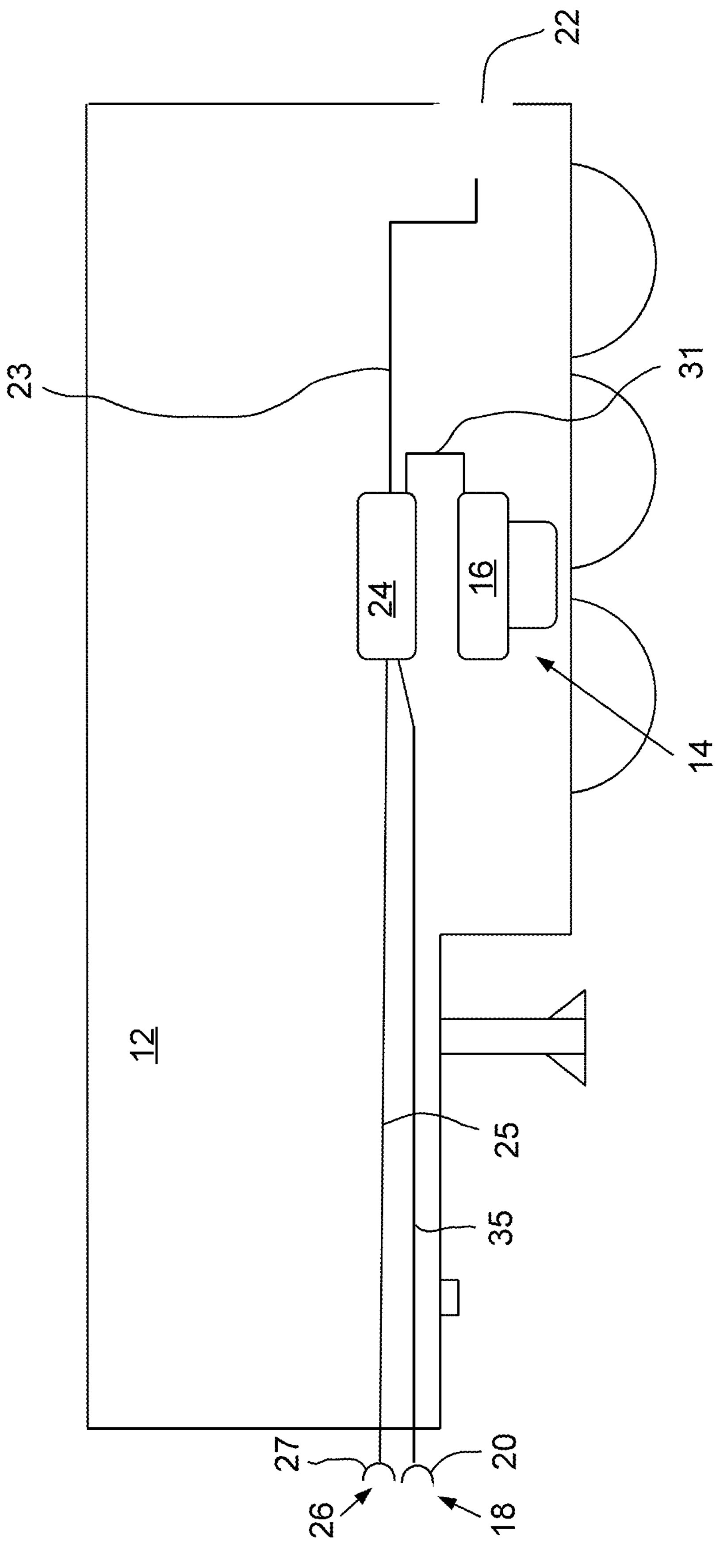
FIG. 3 shows the trailer vehicle according to FIG. 2, having an electronic brake system, by way of a second embodiment.

A second embodiment is shown in FIG. 3. In this case, electrical connections 25, 35 are routed to the electronic control device 24. The brake control device 16 is exclusively supplied with voltage via the electronic control device 24.

Although no redundancy is provided per se, the voltage supply of the brake control device 16 is relatively secure, as the voltage supply is duplicated via the exposed interfaces 18, 26, and the electrical connection 31 includes a short conductor only, which is not to be released during operation.

In FIG. 3, in the interests of simplicity, the interface 17 having the electrical connection 30 and the brake light 21 is not illustrated, but can nevertheless be present.

Figure 4:
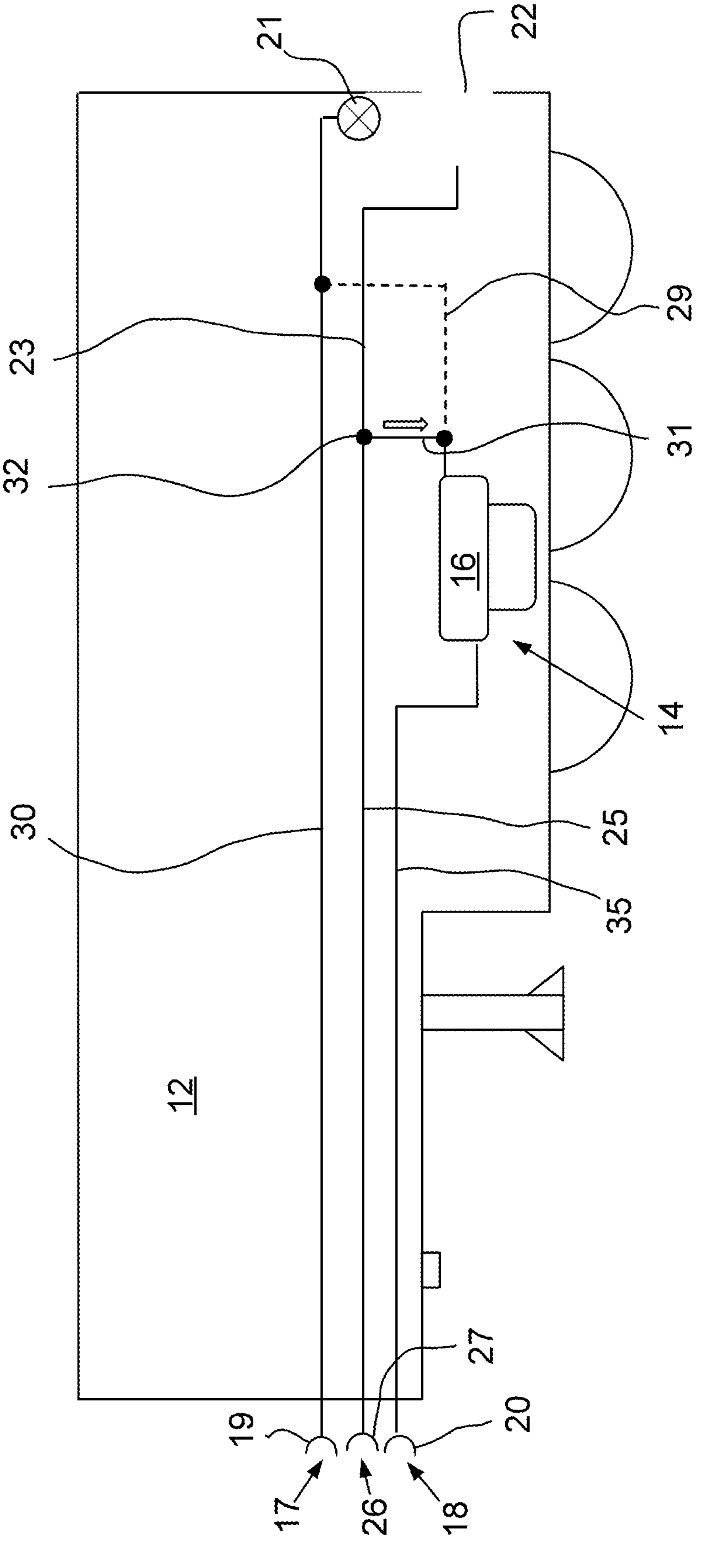
FIG. 4 shows the semi-trailer according to FIG. 2, having an electronic brake system, by way of a third embodiment.

FIG. 4 shows the third embodiment, by way of a variant of the first embodiment, but excluding the electronic control device 24. The electrical connection 31, in the region of a node 32, is interconnected with the electrical connections 23, 25. Signals from the sensor 22 are processed either in the sensor 22 itself, or in a control device of the tractor 11, or at another unrepresented location, insofar as necessary. As represented in FIG. 4, the electrical connection 31 is configured unidirectionally, and thus for the supply of voltage to the brake control device 16, additionally to the voltage supply via the electrical connection 35.

Figure 5:
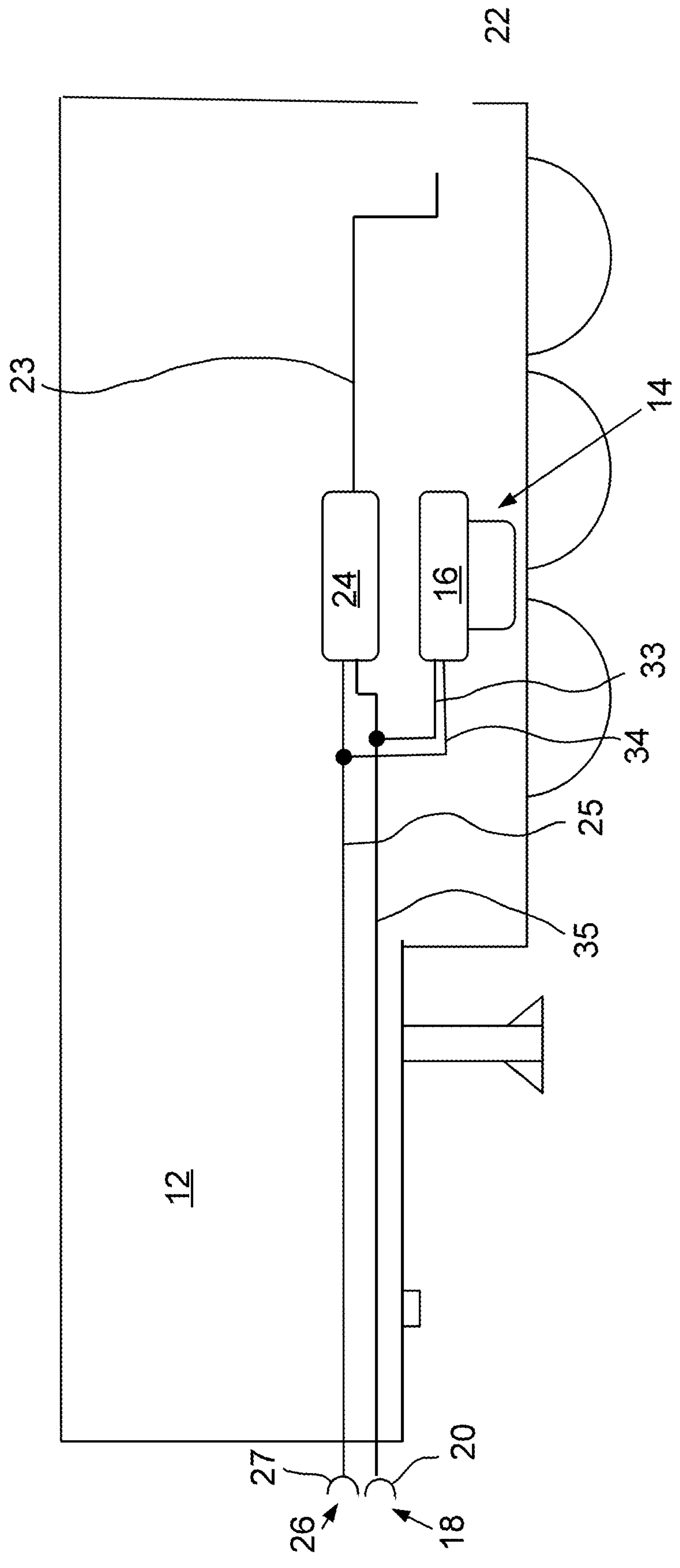
FIG. 5 shows the semi-trailer according to FIG. 2, having an electronic brake system, by way of a fourth embodiment.

FIG. 5 shows a fourth embodiment. Again, in the interests of simplicity, the interface 17 having the electrical connection 30 and the brake light 21 is not represented, but can nevertheless be present. The brake control device 16 and the electronic control device 24 are both connected to the two electrical connections 25, 35 to the interfaces 18, 26. To this end, the brake control device 16 includes two spur lines 33, 34. Both control devices 16, 24 thus include a redundant voltage supply.

The above-mentioned electrical connections and spur lines 23, 25, 28, 29, 30, 31, 33, 34, 35 incorporate conductors which are at least appropriate for a voltage supply, optionally in combination with data lines and/or further electrical conductors.

Figure 6C:
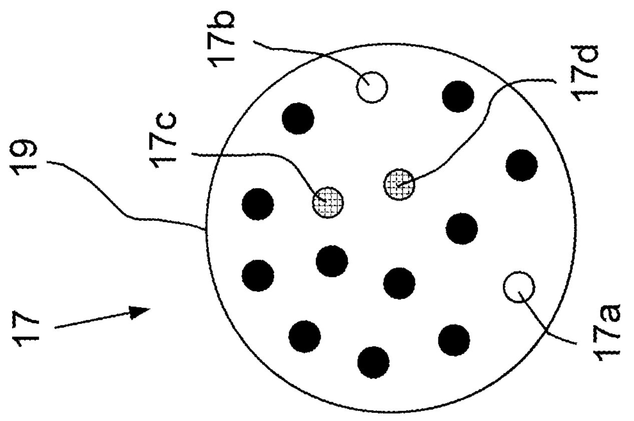
FIG. 6A shows a first plug connector, as a constituent of a first electrical interface having a voltage supply.
FIG. 6B shows a second plug connector, as a constituent of a second electrical interface having a voltage supply; and, FIG. 6C shows a third plug connector, as a constituent of a third electrical interface having a voltage supply.
Figure 6B:
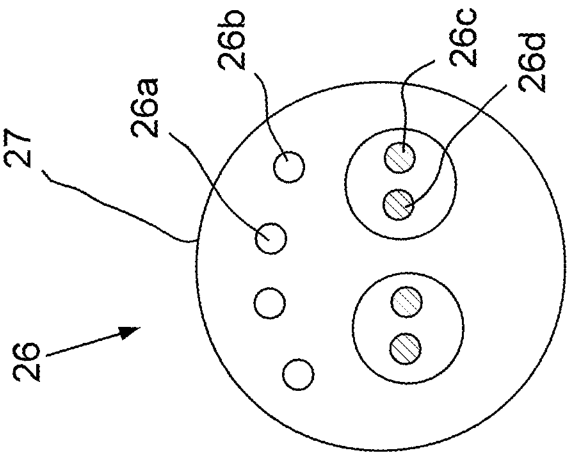
Figure 6A:
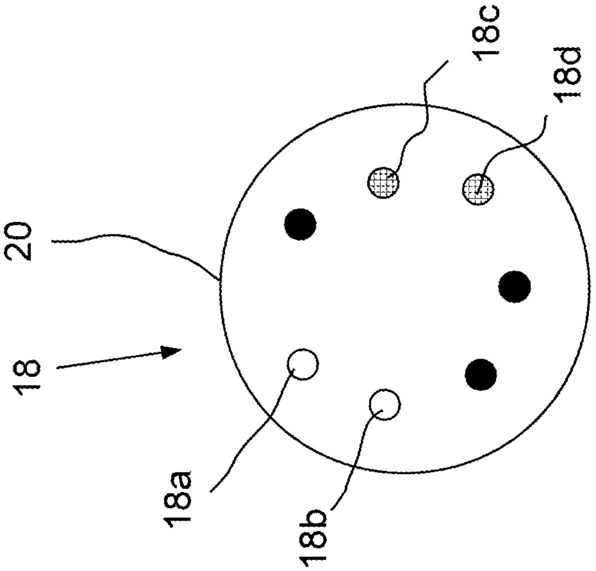

FIGS. 6A, 6B, 6C show the plug connectors 20, 27, 19 of the interfaces 18, 26, 17. Each interface 18, 26, 17 includes unrepresented electrical conductors for a voltage supply. Correspondingly, the plug connectors 20, 27, 19 are provided with electrical contacts 18*a*, 18*b*, 26*a*, 26*b* and 17*a*, 17*b*, which are connected to electrical conductors for the supply of voltage. Depending upon the configuration, the voltage supply of the brake control device 16 is routed via one of the three interfaces 18, 26, 17 and thus, in each case, via two associated contacts 18*a*, 18*b*, 26*a*, 26*b* and 17*a*, 17*b* or respectively, in an auxiliary manner, via two further contacts 18*a*, 18*b*, 26*a*, 26*b* or 17*a*, 17*b* of one of the other three interfaces 18, 26, 17. The same applies to the voltage supply of the electronic control device 24.

According to their function, the plug connectors 20, 27, 19 include further contacts, inter alia for data transmission-see contacts 18*c*, 18*d* in FIG. 6A, contacts 26*c*, 26*d* in FIG. 6B and contacts 17*c*, 17*d* in FIG. 6C.

It is understood that the foregoing description is that of the preferred embodiments of the invention and that various changes and modifications may be made thereto without departing from the spirit and scope of the invention as defined in the appended claims.

LIST OF REFERENCE NUMBERS, INCLUDED IN THE DESCRIPTION

10 Vehicle combination
11 Tractor
12 Semi-trailer
13 Electronic brake system
14 Electronic brake system

15 Brake control device
16 Brake control device
17 Interface
17*a* Contact
17*b* Contact
17*c* Contact
17*d* Contact
18 Interface
18*a* Contact
18*a* Contact
18*c* Contact
18*d* Contact
19 Plug connector
20 Plug connector
21 Brake light
22 Sensor
23 Electrical connection
24 Electronic control device
25 Electrical connection
26 Interface
26*a* Contact
26*b* Contact
26*c* Contact
26*d* Contact
27 Plug connector
28 Electrical connection
29 Electrical connection
30 Electrical connection
31 Electrical connection
32 Node
33 Spur line
34 Spur line
35 Electrical connection

The invention claimed is:

1. An electronic brake system for a trailer vehicle, the electronic brake system comprising:

a brake control device;

a first electrical interface for connecting to a tractor vehicle and having a first voltage supply for specific electrical loads in the trailer vehicle;

a high-speed data interface, separate from said first electrical interface, for connecting to the tractor vehicle and having a second voltage supply integrated therein; and, said brake control device being connected to said second voltage supply.

2. The electronic brake system of claim 1, wherein said brake control device is also connected to said first voltage supply.

3. The electronic brake system of claim 1, wherein said brake control device is connected to said second voltage supply via an electrical connection and an electronic control device.

4. The electronic brake system of claim 3, wherein said electrical connection between said brake control device and said electronic control device is configured bidirectionally such that said brake control device, via said electrical connection and said electronic control device, is connected to said second voltage supply, and said electronic control device, via said electrical connection and said brake control device, is connected to said first voltage supply.

5. The electronic brake system of claim 1 further comprising an electronic control device to deliver data from at least one sensor of the trailer vehicle to the tractor vehicle via said high-speed data interface.

6. The electronic brake system of claim 1, wherein said brake control device is connected to said first voltage supply via an electrical connection and an electronic control device.

7. The electronic brake system of claim 1, wherein said first electrical interface is configured according to ISO 7638 1/2:2018.

8. The electronic brake system of claim 1, wherein said high-speed data interface includes at least two data connections and two connections to said second voltage supply.

9. The electronic brake system of claim 1, wherein said brake control device is connected to a third voltage supply; and, said third voltage supply is an element of a further electrical interface for connecting to the tractor vehicle.

10. The electronic brake system of claim 9, wherein said further electrical interface is configured according to ISO 12098:2020.

11. A trailer vehicle comprising:

an electronic brake system including a brake control device and a first electrical interface for connecting to a tractor vehicle;

said first electrical interface having a first voltage supply for specific electrical loads in the trailer vehicle;

said electronic brake system further including a high-speed data interface, separate from said first electrical interface, for connecting to the tractor vehicle;

said high-speed data interface having a second voltage supply integrated therein; and, said brake control device being connected to said second voltage supply.

12. The trailer vehicle of claim 11, wherein the trailer vehicle is a semi-trailer.

13. The trailer vehicle of claim 11, wherein the trailer vehicle is included in a vehicle class O3 or a vehicle class O4.

14. A brake control device for an electronic brake system in a trailer vehicle, the electronic brake system including a first electrical interface for connecting to a tractor vehicle and having a first voltage supply for specific electrical loads in the trailer vehicle, a high-speed data interface, separate from the first electrical interface, for connecting to the tractor vehicle and having a second voltage supply integrated therein, the brake control device comprising:

an electrical connection to an electronic control device for the trailer vehicle;

a brake controller connected to the second voltage supply;

said brake control device being configured to be connected to said second voltage supply;

wherein, when the brake control device is connected to the first voltage supply, the electronic control device is configured to be supplied with voltage via said electrical connection and the brake control device; and, wherein, when the electronic control device is connected to the second voltage supply, the brake control device is configured to be supplied with voltage via said electrical connection and the electronic control device.

* * * * *